United States Patent
Zerkus et al.

(10) Patent No.: US 10,982,808 B2
(45) Date of Patent: Apr. 20, 2021

(54) VALVE CONTROL AND/OR LUBRICATION SYSTEM

(71) Applicant: FMC Technologies, Inc., Houston, TX (US)

(72) Inventors: James Michael Zerkus, Seabrook, TX (US); Steven Dornell Raymond, Houston, TX (US); Thiago Guimaraes Machado, Houston, TX (US); Rajeev Rajan Pillai, Houston, TX (US)

(73) Assignee: FMG Technologies, Inc., Houston, TX (US)

(*) Notice: Subject to any disclaimer, the term of this patent is extended or adjusted under 35 U.S.C. 154(b) by 56 days.

(21) Appl. No.: 16/407,085

(22) Filed: May 8, 2019

(65) Prior Publication Data
US 2020/0355321 A1  Nov. 12, 2020

(51) Int. Cl.
| | | |
|---|---|---|
| *F16N 7/38* | (2006.01) | |
| *F16K 3/36* | (2006.01) | |
| *E21B 34/02* | (2006.01) | |
| *E21B 43/26* | (2006.01) | |

(52) U.S. Cl.
CPC ............ *F16N 7/385* (2013.01); *E21B 34/02* (2013.01); *E21B 43/26* (2013.01); *F16K 3/36* (2013.01); *F16N 2270/70* (2013.01)

(58) Field of Classification Search
CPC ........ F16N 7/385; F16N 7/38; F16N 2270/70; E21B 34/02; E21B 34/025; E21B 34/04; E21B 34/045; E21B 43/26; E21B 43/2605; E21B 43/2607; E21B 33/0355; F16K 3/36
See application file for complete search history.

(56) References Cited

U.S. PATENT DOCUMENTS

| | | | | |
|---|---|---|---|---|
| 3,570,804 A | * | 3/1971 | Nelson | ................. F16K 31/143 251/25 |
| 3,958,592 A | * | 5/1976 | Wells | .................... F16K 3/0254 137/315.3 |
| 4,557,325 A | | 12/1985 | Gall | |
| 5,166,677 A | | 11/1992 | Schoenberg | |

(Continued)

FOREIGN PATENT DOCUMENTS

WO    WO 90/03490 A1    4/1990

*Primary Examiner* — David Colon-Morales
(74) *Attorney, Agent, or Firm* — Henry C. Query, Jr.

(57) ABSTRACT

A system for operating and/or lubricating a plurality of valves which are mounted on a number of christmas trees and which each include a hydraulic actuator which is operated by hydraulic pressure from a hydraulic pressure source and a lubricant inlet which is connected to an interior portion of the valve that is configured to receive a lubricant from a lubricant source. The system includes a plurality of control units, each of which is associated with a respective valve and each of which has at least one of a hydraulic pressure line which is connectable to the hydraulic pressure source and a lubricant line which is connectable to the lubricant source. Each control unit is operable to selectively connect the hydraulic pressure source to the hydraulic actuator to thereby operate the valve and/or to selectively connect the lubricant source to the lubricant inlet to thereby communicate lubricant into the interior portion of the valve.

26 Claims, 7 Drawing Sheets

(56) References Cited

U.S. PATENT DOCUMENTS

| | | | |
|---|---|---|---|
| 6,619,431 B2* | 9/2003 | Wilcox | F16C 33/6625 |
| | | | 184/105.3 |
| 8,616,274 B2 | 12/2013 | Belcher et al. | |
| 8,991,499 B2 | 3/2015 | Nevison | |
| 9,702,212 B2* | 7/2017 | Breda | E21B 43/129 |
| 9,726,643 B2 | 8/2017 | Comeaux et al. | |
| 9,938,866 B2* | 4/2018 | Borek | F16C 33/667 |
| 10,100,978 B2* | 10/2018 | Gouge | F16N 13/22 |
| 10,753,535 B2* | 8/2020 | McKim | F16N 13/22 |
| 2010/0300696 A1 | 12/2010 | McCalvin et al. | |
| 2013/0233560 A1 | 9/2013 | Davidson | |
| 2014/0290768 A1 | 10/2014 | Randle et al. | |
| 2014/0352968 A1 | 12/2014 | Pitcher et al. | |
| 2015/0345272 A1 | 12/2015 | Kajaria et al. | |
| 2017/0114957 A1* | 4/2017 | Conley | F16N 7/385 |
| 2018/0258742 A1* | 9/2018 | Sveberg | E21B 43/017 |
| 2019/0010781 A1* | 1/2019 | Tran | E21B 33/02 |
| 2019/0360637 A1* | 11/2019 | McKim | F16N 11/00 |

* cited by examiner

VALVE CONTROL AND/OR LUBRICATION SYSTEM

FIELD OF THE DISCLOSURE

The present disclosure is directed to a system for controlling and/or lubricating a plurality of flow control valves, such as valves of a type which are used on frac trees at a well fracturing site. In particular, the disclosure is directed to a system which communicates the hydraulic fluid used to actuate the valves and/or the lubricant used to lubricate the valves to the frac trees over a single hose set, thereby greatly reducing the number of hydraulic fluid and lubricant hoses which otherwise would be required at the frac site.

BACKGROUND OF THE DISCLOSURE

Typical prior art well fracturing operations employ a number of frac trees which each include a plurality of hydraulically operated valves. These valves include valve actuators which are operated by hydraulic pressure that is often supplied by a centrally located hydraulic pressure unit (HPU). Each valve actuator normally comprises two piston chambers which are each connected to the HPU via a respective hydraulic hose. Thus, depending on the number of frac trees which are used at the frac site and the number of hydraulically operated valves which each frac tree employs, dozens of hydraulic hoses may be required to connect all of the valve actuators with the HPU. However, such a large number of hoses are very costly, can be time consuming to install and pose trip hazards to personnel at the frac site.

Also, due to the relatively high pressures employed in fracking operations, a possibility exists that the fracking fluid will enter the valve cavity and interfere with the ability of the valve to seal properly. Consequently, the cavity is usually filled with a lubricant, such as grease. The lubricant not only forms a barrier to prevent the ingress of fracking fluid into the cavity, but also cleans and coats the sealing surfaces of the valves. However, over time the lubricant tends to break down and become depleted. As a result, additional lubricant must periodically be injected into the cavity; and the act of pumping in the grease flushes fracking fluid and debris from the valve cavity.

In the prior art, the lubricant is often injected manually by an operator using a grease pump or "grease gun". However, this is a time consuming process and exposes the operator to the dangers inherent in the areas surrounding the frac trees. As an alternative, the valves may be connected to a centralized lubrication system. In such a system, individual lubricant hoses are used to connect each lubricant fitting on the valve to a centralized lubrication system. Once again, however, this arrangement requires the use of a large number of hoses, which is costly, can be time consuming to install and pose trip hazards to personnel at the frac site.

SUMMARY OF THE DISCLOSURE

In accordance with the present disclosure, these and other issues in the prior art are addressed by providing a valve control and/or lubrication system for operating and/or lubricating a plurality of valves which are mounted on a number of Christmas trees. Each valve comprises a hydraulic actuator which is operated by hydraulic pressure from a hydraulic pressure source and/or a lubricant inlet which is connected to an interior portion of the valve which is configured to receive a lubricant from a lubricant source. The system includes a plurality of control units, each of which is associated with a respective valve and each of which comprises at least one of a hydraulic pressure line which is connectable to the hydraulic pressure source and a lubricant line which is connectable to the lubricant source. Each control unit further comprises at least one of a hydraulic port and a lubricant port, and the system further comprises at least one of a hydraulic conduit which is connected between the hydraulic port and the hydraulic actuator and a lubricant conduit which is connected between the lubricant port and the lubricant inlet. Each control unit also includes at least one of a hydraulic activation means for selectively connecting the hydraulic pressure line to the hydraulic port and a lubricant activation means for selectively connecting the lubricant line to the lubricant port. In operation, each control unit is operable to selectively connect the hydraulic pressure source to the hydraulic actuator to thereby operate the valve and/or to selectively connect the lubricant source to the lubricant inlet to thereby communicate lubricant into the interior portion of the valve.

In accordance with one aspect of the disclosure, the hydraulic activation means comprises an electrically, hydraulically or pneumatically operated first valve which is connected between the hydraulic pressure line and the hydraulic port. The first valve may comprise, e.g., a solenoid operated valve.

In accordance with another embodiment of the disclosure, each control unit also comprises a hydraulic return line which is connectable to the hydraulic pressure source and first and second hydraulic ports which are connected via respective first and second hydraulic conduits to the hydraulic actuator. In operation, the hydraulic activation means is operable to selectively connect the hydraulic pressure and return lines to the hydraulic actuator to thereby operate the valve. In this embodiment, the hydraulic activation means may comprise an electrically, hydraulically or pneumatically operated first valve which is connected between the hydraulic pressure and return lines and the first and second hydraulic ports. The first valve may comprise, e.g., a solenoid operated directional control valve.

In accordance with yet another embodiment of the disclosure, the lubricant activation means comprises a first valve which is connected between the lubricant line and the lubricant port.

In accordance with a further embodiment of the disclosure, the lubricant activation means comprises a lubricant pump which is connected between the lubricant line and the lubricant port. In accordance with one aspect of the disclosure, the lubricant pump comprises a first cylinder which is alternately connectable to the hydraulic pressure and return lines and a second cylinder which is connected to the lubricant line. In accordance with another aspect of the disclosure, the lubricant activation means further comprises an electrically, hydraulically or pneumatically operated first valve which is connected between the first cylinder and the hydraulic pressure and return lines, and wherein the first valve is configured to alternately connect the first cylinder to the hydraulic pressure and return lines to thereby operate the lubricant pump.

In accordance with another embodiment of the disclosure, the valve comprises first and second lubricant inlets, each control unit comprises first and second lubricant ports which are connected to the lubricant inlets by respective first and second lubricant conduits, and the lubricant activation means further comprises an electrically, hydraulically or pneumatically operated second valve which is connected between the lubricant pump and the first and second lubricant ports. At least one of the first and second valves may comprise a solenoid operated directional control valve.

In accordance with one aspect of the disclosure, each control unit comprises a controller which is configured to operate the hydraulic activation means and/or the lubricant activation means.

In accordance with another aspect of the disclosure, each control unit further comprises means for enabling an operator to manually operate the hydraulic activation means and/or the lubricant activation means.

In accordance with yet another aspect of the disclosure, the system may comprise a control computer which is located remotely of the Christmas trees and is configured to control the operation of the controllers.

In accordance with a further aspect of the disclosure, the system may comprise means for identifying to the control computer the valves to which the control units are connected. In one embodiment, the identifying means may comprise a unique identifier for each control unit and location and function information for the valve to which each control unit is or will be connected, and the identifier and location and function information may be stored in digital form in a storage device which is accessible by the control computer.

In accordance with another aspect of the disclosure, the identifying means may comprise means for designating the location and function information of each valve and means for determining the location and function information from the designating means. In one embodiment, the designating means may comprise a number of machine-readable tags which are connected to each control unit and are encoded with the location and function information of the valve to which the control unit is will be connected. In accordance with another embodiment, the determining means may comprise an electronic media reader which is configured to read the tags. In accordance with yet another embodiment of the disclosure, the tags may be removably connected to the control units.

In accordance with a further embodiment of the disclosure, each control unit may comprise a number of status lamps, and the controller may be configured to operate the status lamps to provide visual indications of certain conditions of the control unit.

In accordance with one aspect of the disclosure, the hydraulic pressure and return lines of each control unit on each Christmas tree are connected in series with the hydraulic pressure and return lines of another control unit on that tree.

In accordance with another aspect of the disclosure, the system may comprise a number of manifold units, each of which is positioned on or adjacent a corresponding Christmas tree. In this embodiment, the control units of each tree may be connected either directly or indirectly to the manifold unit for that tree.

In accordance with yet another aspect of the disclosure, each manifold unit may be connected in series with another manifold unit.

In accordance with a further aspect of the disclosure, each control unit may be positioned on its respective valve.

Thus, the valve control and/or lubrication system of the present disclosure eliminates the need to connect each valve on each frac tree to the lubricant and hydraulic pressure sources. Instead, all of the valves are connected, either directly or indirectly, to the lubricant and hydraulic pressure sources using a single hose set. This arrangement not only reduces the amount of time and labor required to set up the frac operation, but also minimizes hose cost and trip hazards at the frac site.

These and other objects and advantages of the present disclosure will be made apparent from the following detailed description, with reference to the accompanying drawings. In the drawings, the same reference numbers may be used to denote similar components in the various embodiments.

DETAILED DESCRIPTION

In general, the present disclosure is directed to a system for controlling and/or lubricating a plurality of valves which are mounted on a number of Christmas trees and/or manifolds. The system is particularly applicable to valves of the type which comprise a hydraulic actuator which is operated by hydraulic pressure from a hydraulic pressure source and/or a lubricant inlet which is connected to an interior portion of the valve that is configured to receive a lubricant from a lubricant source.

In one embodiment of the disclosure, the system includes a plurality of control units, each of which is associated with a respective valve, and each of which comprises at least one of a hydraulic pressure line which is connectable to the hydraulic pressure source and a lubricant line which is connectable to the lubricant source. Each control unit also includes at least one of a hydraulic port and a lubricant port; at least one of a hydraulic conduit connecting the hydraulic port to the hydraulic actuator and a lubricant conduit connecting the lubricant port to the lubricant inlet; and at least one of a hydraulic activation means for selectively connecting the hydraulic pressure line to the hydraulic port and a lubricant activation means for selectively connecting the lubricant line to the lubricant port.

In this manner, each control unit is operable to selectively connect the hydraulic pressure source to the hydraulic actuator to thereby operate the valve and/or to selectively connect the lubricant source to the lubricant inlet to thereby communicate lubricant into the interior portion of the valve.

Figure 1:
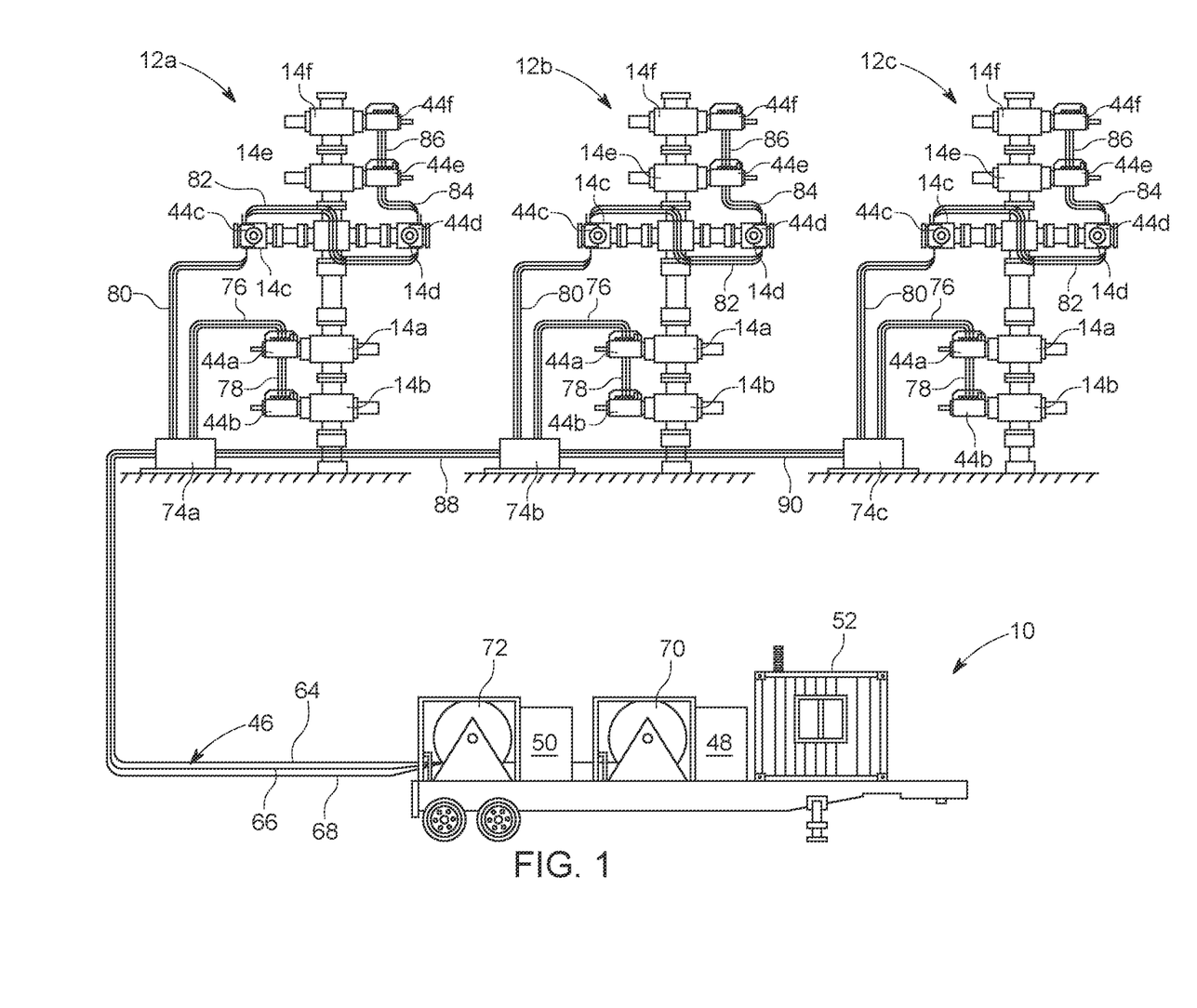
FIG. 1 is a schematic representation showing one embodiment of the valve control and/or lubrication system of the present disclosure in the context of an illustrative well fracturing site comprising a control center and a number of frac trees.
Figure 2:
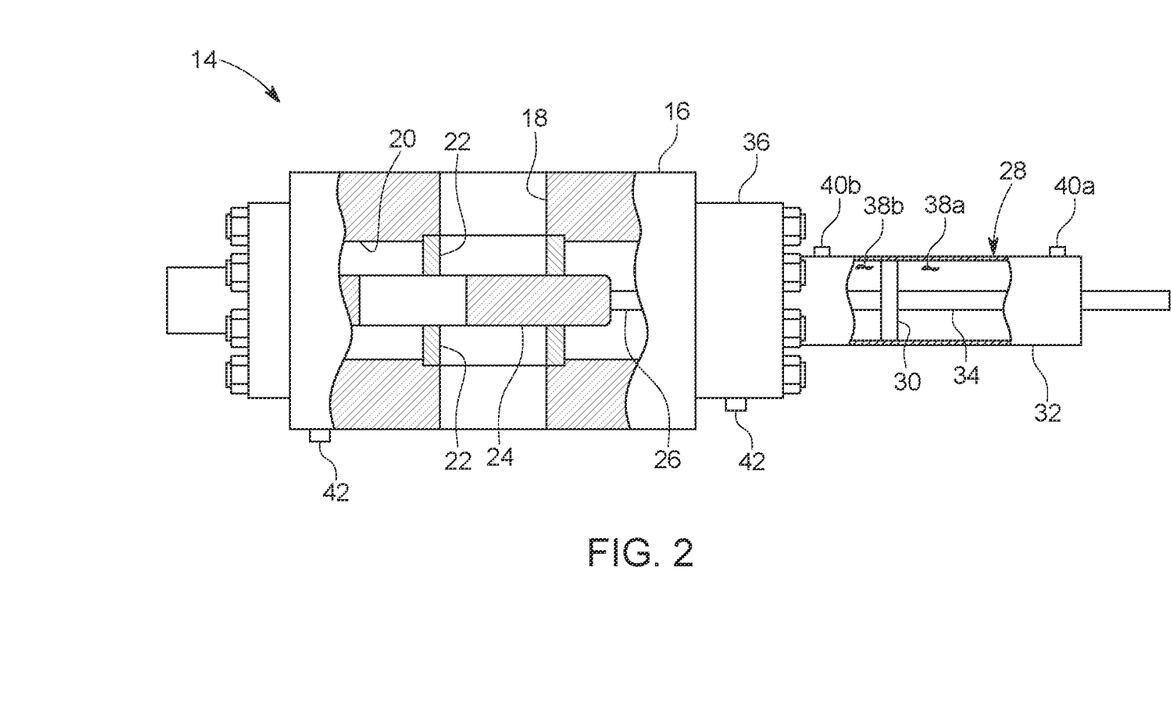
FIG. 2 is a partial cross sectional representation of a conventional gate valve of the type which may be used on a frac tree.

Referring to FIG. 1, a first embodiment of the valve control and lubrication system of the present disclosure is shown in the context of a representative well fracturing operation comprising a control trailer 10 and a number of frac trees 12, each of which is installed over a corresponding well bore. Each frac tree 12 comprises a plurality of flow control valves 14. As shown in FIG. 2, which is a partial cross sectional view of a conventional gate valve commonly used in frac service, each valve 14 includes a valve body 16 through which a flowbore 18 extends, a cavity 20 which intersects the flowbore, a pair of spaced apart seats 22 which each comprise a through bore that is aligned with the flowbore, a gate 24 which is movably positioned between the seats, and a valve stem 26 having a first end which is connected to the gate and a second end which is connected to a hydraulic valve actuator 28.

The valve actuator 28 includes a piston 30 which is slidably positioned in a cylinder 32, The piston 30 is connected to a shaft 34 which in turn is connected to the valve stem 26 to thereby link the piston to the gate 24. The shaft 34 extends through a bonnet 36 which is bolted to the valve body 16 and serves to seal the cavity 20 from the cylinder 32. The piston 30 divides the cylinder 32 into first and second sealed piston chambers 38*a*, 38*b* each of which is selectively connectable via a corresponding conventional hydraulic fitting 40*a*, 40*b* to a hydraulic pressure source or a hydraulic return tank (not shown). Thus, by selectively connecting one of the piston chambers 38*a*, 38*b* to the hydraulic pressure source and the other piston chamber to the return tank, the piston 30 can be made to move the gate 24 into a position to either open or close the flowbore 18.

The piston chambers 38*a*, 38*b* of each valve actuator 28 are normally connected to the hydraulic pressure source or the return tank via two separate hydraulic hoses. A first end of each hose is connected to a corresponding hydraulic fitting 40*a*, 40*b*, and a second end of each hose is connected to a centralized hydraulic power unit (HPU) which contains the hydraulic pressure source, the return tank and a valving device for selectively connecting each hose to either the hydraulic pressure source or the return tank, depending on whether the valve 14 is to be opened or closed.

As discussed above, due to the relatively high pressures employed in fracking operations, a possibility exists that the fracking fluid will enter the cavity 20 and interfere with the ability of the gate 24 to form an effective seal with the seats 22. Accordingly, the cavity 20 is usually filled with a lubricant, such as grease. The lubricant not only forms a barrier to prevent the ingress of fracking fluid into the cavity 20, but also cleans and coats the gate 24 and seat 22 sealing surfaces. However, over time the lubricant tends to break down and become depleted, which greatly diminishes the ability of the lubricant to prevent the ingress of fracking fluid into the cavity 20 and to lubricate the gate 24 and seat 22 sealing surfaces. Also, the act of pumping in the grease flushes fracking fluid and debris from the valve cavity. Therefore, additional lubricant must periodically be injected into the cavity 20 during fracking operations.

Consequently, the gate valve 14 is normally provided with one or more lubricant inlets 42, such as, e.g., conventional lubricant fittings, through which the lubricant can be injected into an interior portion of the valve, such as the cavity 20. As shown in FIG. 2, the fittings 42 may be located, e.g., on the valve body 16 and the bonnet 36. The lubricant can be injected manually by an operator using a grease pump. However, this is a time consuming process and exposes the operator to the dangers inherent in the areas surrounding the frac trees. As an alternative to manually lubricating the valves, the valves may be connected to a centralized lubrication system. In such a system, individual lubricant hoses are used to connect each lubricant fitting to the lubrication system, which typically comprises a lubricant source, a lubricant pump and a valving device for selectively connecting each lubricant hose to the lubricant source.

Thus, prior art fracking installations which use frac trees having valves of the type shown in FIG. 2 typically require at least three hoses to connect each valve to the HPU and the lubrication system: at least two hydraulic hoses to connect the valve to the HPU, and at least one lubricant hose to connect the valve to the lubrication system (depending on the number of lubricant fittings 42 the valve has). Depending on the number of frac trees which are deployed at the frac site and the number of hydraulically operated valves each frac tree employs, several dozen hoses may be required to connect all of the valves with the HPU and the lubrication system. However, such a large number of hoses can be time consuming to install and pose trip hazards to personnel at the frac site.

The need for so many individual hoses in prior art fracking installations arises from the fact that the direction control valving device required to selectively connect each hydraulic hose to the hydraulic pressure source/return tank in the HPU and the valving device required to selectively connect each lubricant hose to the lubricant source in the lubrication system are typically located within or near the HPU and the lubrication system, respectively. Thus, direct connections must exist between each hydraulic valve actuator 28 and the direction control valving device for the HPU, and direct connections must exist between each lubricant port and the valving device for the lubrication system. In the prior art, these direct connections are provided by the individual hydraulic and lubricant hoses.

Figure 3:
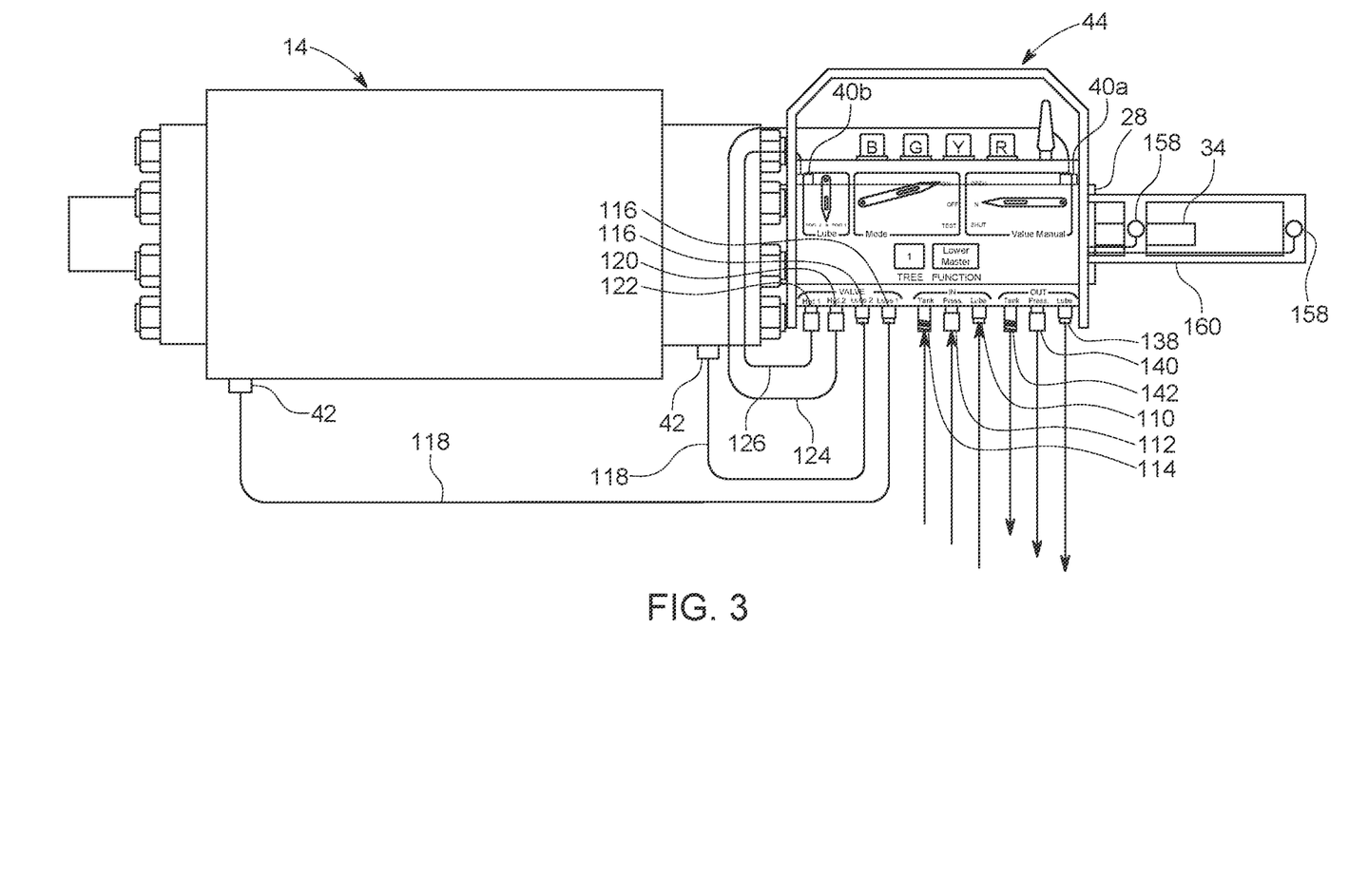
FIG. 3 is a side elevation view of an embodiment of the control unit component of the valve control and/or lubrication system of the present disclosure shown mounted on the valve of FIG. 2.

In accordance with the present disclosure, the need for a large number of individual hoses to connect the HPU and the lubrication system to all of the valves of the fracking installation is eliminated by relocating the direction control valving functionality of the HPU and the lubrication system to the individual valves. As shown in FIG. 1, this is accomplished through the use of a plurality of control units 44, each of which is associated with a respective valve 14 and is configured to selectively connect the HPU and the lubrication system to the valve. As shown in FIG. 3, each control unit 44 may be mounted to the valve actuator 28 using conventional means, such as bolts, straps or brackets (not shown). Alternatively, each control unit 44 may be mounted to the valve body 16 or to a portion of the tree 12 located proximate the valve 14. In yet another alternative, all of the control units 44 for the valves of a particular tree 12 may be positioned on a skid or other supporting surface (not shown) located adjacent the tree.

Figure 4:
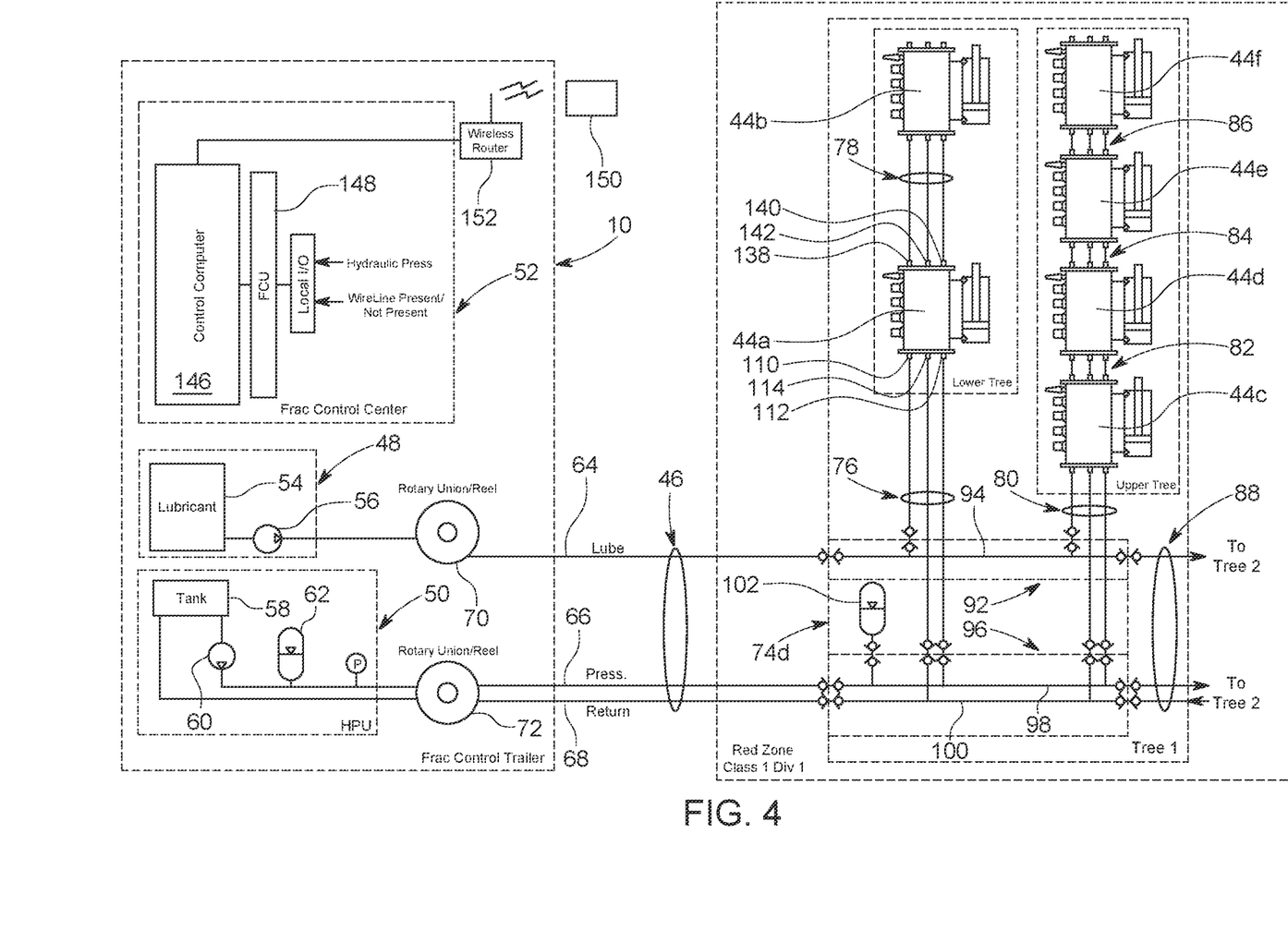
FIG. 4 is a schematic representation of one embodiment of the valve control and/or lubrication system of the present disclosure showing the interconnection between a frac control trailer and a frac tree.

Referring still to FIG. 1, all of the control units 44 are connectable, either directly or indirectly, to both a lubricant source and a hydraulic pressure source using a single hose set 46. In an accordance with an exemplary embodiment of the disclosure, the lubricant source and the hydraulic pressure source may be provided by a lubrication system 48 and an HPU 50, respectively. The lubrication system 48 and the HPU 50 may be positioned, e.g., on the control trailer 10, which may also include a control center 52 for use in monitoring and controlling the fracking operation. Referring also to FIG. 4, which is a schematic diagram of the control trailer 10 and the control units 44 of a first tree 12*a*, the lubricant source 48 may include a supply of lubricant 54 and an optional lubricant pump 56, and the HPU may include a tank 58 containing a supply of hydraulic fluid, a hydraulic fluid pump 60, and an optional accumulator 62.

In accordance with an embodiment of the present disclosure which is particularly applicable to valves 14 of the type shown in FIG. 2 in which the valve actuator 28 comprises two pressure chambers 38a, 38b, the first hose set 46 includes three hoses for connecting the control units 44 to the lubricant source and the hydraulic pressure source: a lubricant hose 64 which is connected to the lubrication supply 54, a hydraulic pressure hose 66 which is connected to the outlet of the hydraulic fluid pump 60 or the accumulator 62, if present, and a hydraulic return hose 68 which is connected to the tank 58. As shown in FIG. 1, the lubricant hose 64 may be wound on a lubricant hose reel 70, and the hydraulic pressure and return hoses 66, 68 may be wound together on a single hydraulic hose reel 72.

In the embodiment of the disclosure shown in FIG. 1, the first hose set 46 is connected to a first manifold unit 74a which is located on or adjacent a first frac tree 12a. The first manifold unit 74a is connected via a second hose set 76 to a first control unit 44a which is mounted on a first valve 14a located in the lower part of the tree 12a. The first control unit 44a is in turn connected, via a third hose set 78, to a second control unit 44b which is mounted on a second valve 14b located on the lower half of the tree. In this embodiment, the first manifold unit 74a is also connected, via a fourth hose set 80, to a third control unit 44c which is mounted on a third valve 14c located on an upper part of the tree. The third control unit 44c is in turn connected, via a fifth hose set 82, to a fourth control unit 44d which is mounted on a fourth valve 14d located on the upper part of the tree. The fourth control unit 44d is connected via a sixth hose set 84 to a fifth control unit 44e which is mounted on a fifth valve 14e located on the upper part of the tree. Finally, the fifth control unit 44e is connected via a seventh hose set 86 to a sixth control unit 44f which is mounted on a sixth valve 14f located on the upper part of the tree.

In this embodiment, the first manifold unit 74a is also connected, via an eighth hose set 88, to a second manifold unit 74b located on or adjacent the second frac tree 12b. In a manner similar to that just described, the second manifold unit 74b is connected, either directly or indirectly via respective hose sets 76-86, to a number of control units 44a-44f mounted on corresponding valves 14a-14f on the second frac tree 12b. Likewise, the second manifold unit 74b is connected, via another hose set 90, to a third manifold unit 74c which is located on or adjacent a third frac tree 12c, and the third manifold unit 74c is connected, either directly or indirectly via respective hose sets 76-86, to a number of control units 44a-44f mounted on corresponding valves 14a-14f on the third frac tree 12c. As should be apparent, this arrangement can be used to connect any number of frac trees to the lubrication system 48 and the HPU 50.

Thus, instead of using individual hoses to connect each valve on each frac tree to the lubricant and hydraulic pressure sources 48, 50, as in the prior art, all of the valves 14 (or more specifically all of the control units 44) are connected, either directly or indirectly, to the lubricant and hydraulic pressure sources using a single hose set. In the embodiment of the disclosure shown in FIG. 1, the hose set 46 is used to connect the lubrication system 48 and the HPU 50 to the first manifold unit 74a at the first frac tree 12a, and then additional hose sets 76-86 are used to connect the first manifold unit to the various control units 44a-44f on the first frac tree, as well as to the second manifold unit 74b at the second frac tree 12b, and so on. In this manner, only relatively short hose sets are needed to connect each control 44 unit to its corresponding manifold unit 74 and to connect each manifold unit to a successive manifold unit. All of the hose sets are similar to the first hose set 46 in that they each comprise a lubricant hose, a hydraulic pressure hose and a hydraulic return hose. In addition, the connections of the individual hoses within the hose sets to the manifold units 74 and the control units 44 may comprise any suitable, preferably disconnectable, couplings.

In the embodiment shown in FIG. 1, each manifold unit 74a, 74b, 74c is connected in parallel to two control units 44a, 44c on a corresponding tree 12a, 12b, 12c, and these control units are connected in series with the remaining control units on that tree. However, in an alternative embodiment each manifold unit 74a, 74b, 74c may be connected in parallel to all of the control units 44 on a corresponding tree 12a, 12b, 12c; that is, each manifold unit may be directly connected to all of the control units on the tree using respective hose sets. In another embodiment, each manifold unit 74a, 74b, 74c may be connected in series to all of the control units on a corresponding tree 12a, 12b, 12c; that is, each manifold unit may be connected to a first control unit on the tree using a first hose set, the first control unit may be connected to a second control unit on the tree using a second hose set, the second control unit may be connected to a third control unit on the tree using a third hose set, and so on. In another embodiment of the present disclosure, which will be described below in connection with FIG. 7, the control units 44 are connected to the lubricant source 48 and the hydraulic pressure source 50 without the use of a manifold unit.

Referring to FIG. 4, each manifold unit 74 comprises a lubricant distribution manifold 92 having a lubricant line 94 and a hydraulic distribution manifold 96 having both a hydraulic pressure line 98 and a hydraulic return line 100. The lubricant line 94 is connected to the lubricant hose 64 of the first hose set 46 to thereby connect the lubricant distribution manifold 92 to the lubrication system 48. In a similar fashion, the hydraulic pressure and return lines 98, 100 are respectively connected to the hydraulic pressure and return hoses 66, 68 of the first hose set 46 to thereby connect the hydraulic distribution manifold 96 to the HPU 50. Each manifold unit 74 may also include an optional accumulator 102 which is connected to the hydraulic pressure line 98 and serves to store a quantity of pressurized hydraulic fluid for use in maintaining hydraulic pressure in hose 66 as fluid is used to move a valve actuator.

In the particular embodiment of the disclosure shown in FIG. 1, the control units 44 of each tree 12 are connected either directly or indirectly to the lubrication system 48 and the HPU 50 through their corresponding manifold units 74. As shown in FIG. 4, for instance, the lubricant, hydraulic pressure and hydraulic return lines 94, 98, 100 of the first manifold unit 74a are respectively connected to the lubricant, hydraulic pressure and hydraulic return hoses 64, 66, 68 of the first hose set 46 to thereby connect the first manifold unit to the lubrication system 48 and the HPU 50. In addition, the first and third control units 44a, 44c are connected to the first manifold unit 74a through the second and fourth hose sets 76, 80 to thereby connect these control units to the lubrication system 48 and the HPU 50. Finally, in accordance with an embodiment of the disclosure which will be described below, the remaining control units 44b, 44d, 44e, 44f are respectively connected through the hose sets 78, 82, 84, 86 and the intervening control units to the first manifold unit 74a to thereby connect these control units to the lubrication system 48 and the HPU 50.

Figure 5:
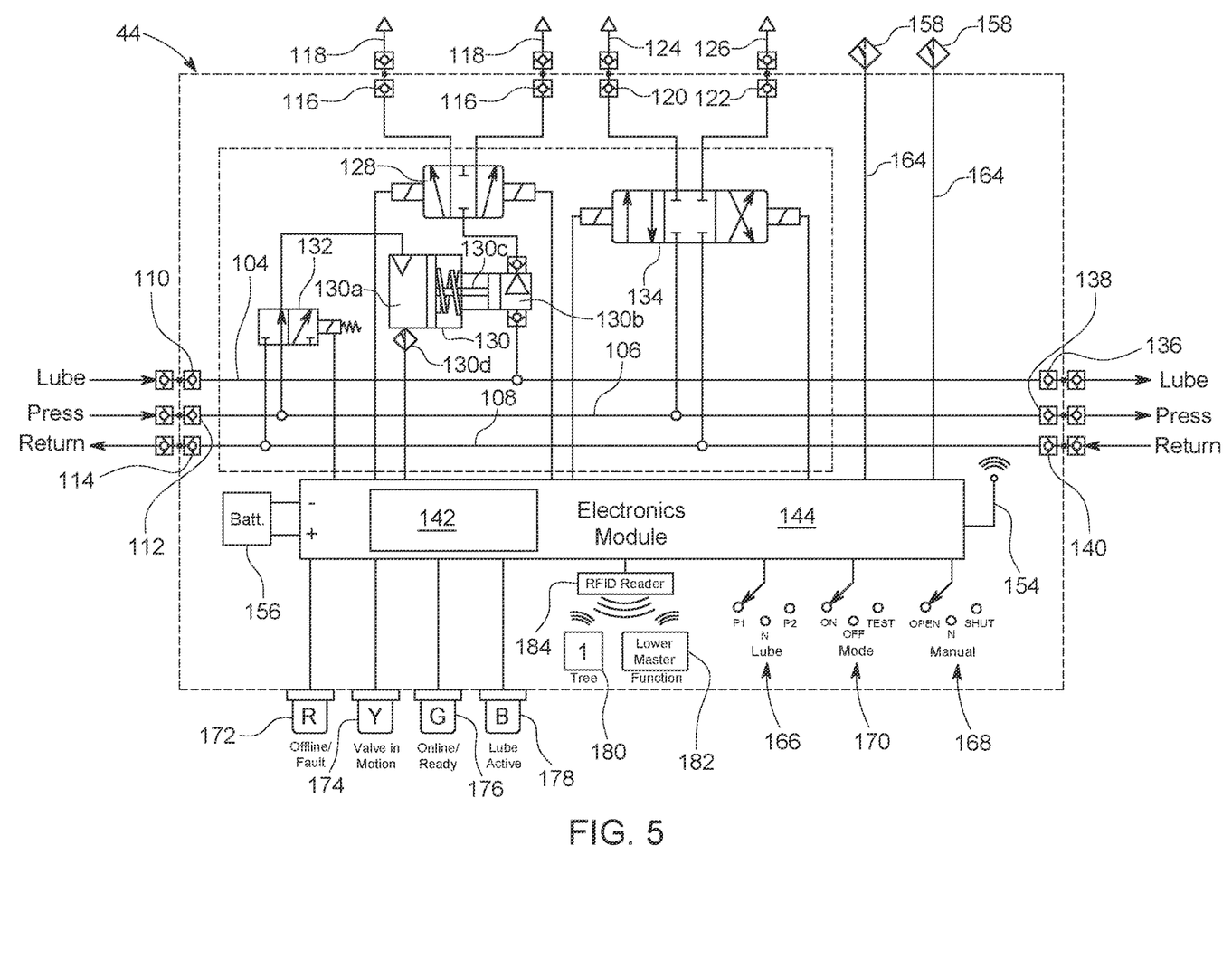
FIG. 5 is a schematic representation of an embodiment of the control unit component of the valve control and/or lubrication system of the present disclosure.

Referring also to FIG. 5, each control unit 44 comprises a lubricant line 104, a hydraulic pressure line 106 and a hydraulic return line 108. The lubricant line 104 is connected to a lubricant inlet 110 which in turn is connectable to the lubricant hose of a corresponding hose set (the hose set 76 for the first control unit 44a, for instance). The hydraulic pressure and return lines 106, 108 are respectively connected to a hydraulic pressure inlet 112 and a hydraulic return inlet 114, which in turn are respectively connectable to the hydraulic pressure and return hoses of the hose set. Referring also to FIG. 3, each control unit 44 further comprises at least one lubricant port 116 which is connectable via a lubricant conduit or hose 118 to a corresponding lubricant fitting 42 on the valve 14, and first and second hydraulic ports 120, 122 which are each connectable via respective first and second hydraulic conduits or hoses 124, 126 to a corresponding hydraulic fitting 40a, 40b on the valve actuator 28.

In accordance with the present disclosure, each control unit 44 additionally includes a lubricant activation means for selectively connecting the lubricant line 104 to the lubricant port 116 and/or a hydraulic activation means for selectively connecting the hydraulic pressure and return lines 106, 108 to the first and second hydraulic ports 120, 122. In one embodiment, lubricant activation means may include, for example, a valve 128 which is connected between the lubricant line 104 and the lubricant port 116. The valve 128 may be a manually operated valve or, as shown in FIG. 5, an electrically operated valve, such as a solenoid operated directional control valve. Alternatively, the valve may be pneumatically or hydraulically operated.

If the control unit 44 comprises a single lubricant port 116, the valve 128 may comprise a two-way, two-position valve. If, on the other hand, the control unit 44 comprises two lubricant ports 116, the valve 128 may comprise a three-way, three-position valve, such as shown in FIG. 5, which is operable to selectively connect the lubricant line 104 to either lubricant port. Alternatively, the valve 128 may comprise a plurality of valves of the type just described, each of which is connected between the lubricant line 104 and a respective lubricant port 116. Variations of such valves may be used to connect the lubricant line 104 to any number of lubricant ports 42.

In an alternative embodiment, the lubricant activation means may include a lubricant pump 130 which is positioned between the lubricant line 104 and the lubricant port 116. In the example shown in FIG. 5, the lubricant pump 130 may comprise a conventional hydraulic intensifier pump which includes, e.g., a low pressure cylinder 130a which is separated from a high pressure cylinder 130b by a movable piston 130c. The low pressure cylinder 130a is connectable to the hydraulic pressure and return lines 106, 108 by a valve 132, such as a spring-return solenoid operated cartridge valve (although other suitable valves or valve arrangements could be used instead), and the high pressure cylinder 130b is connected to the lubricant line 104.

In operation, the valve 132 is actuated to alternately connect the low pressure cylinder 130a to the hydraulic pressure and return lines 106, 108. When the low pressure cylinder 130a is connected to the hydraulic pressure line 106, the pressure will move the piston 130c to the right (as viewed in FIG. 5), which action will expel the lubricant from the high pressure cylinder 130b and through the lubricant port 116. When the low pressure cylinder 130a is connected to the hydraulic return line 108, the pressure in the low pressure cylinder is relieved and a return biasing means, such as a spring, will move the piston 130c to the left (as viewed in FIG. 5), which action will draw the lubricant from the lubricant line 104 into the high pressure cylinder 130b. Thus, by alternately connecting the low pressure cylinder 130a to the hydraulic pressure and return lines 106, 108, the lubricant pump 130 will produce a controlled flow of lubricant from the lubricant line 104 through the lubricant port 116. As shown in FIG. 5, check valves may be provided on the inlet and outlet of the high pressure cylinder 130b to ensure proper flow of the lubricant. Thus, the lubricant line 104 may be selectively connected to the lubricant port 116 by activating the valve 132 to operate the lubricant pump 130 and thereby communicate the lubricant to the lubricant port. In embodiments in which the control unit 44 comprises two or more lubricant ports 116, the lubricant activation means may comprise a plurality of lubricant pumps 130, each of which is connected between the lubricant line and a corresponding lubricant port and is operated by a respective valve 132. In embodiments in which the lubricant activation means includes a lubricant pump 130, the lubricant pump 56 in the lubrication system 48 may not be required.

In yet another alternative embodiment, the lubricant activation means may include both the valve 128 and the lubricant pump 130. In this embodiment, the valve 128 may be connected to the lubricant port 116, and the lubricant pump 130 may be connected between the lubricant line 104 and the valve 128. This embodiment is particularly useful where the control unit 44 comprises two or more lubricant ports 116, as the valve 128 can be activated to select a particular lubricant port 116 to which the output of the lubricant pump 130 is connected.

In another alternative embodiment, the lubricant activation means may comprise a conventional grease injector (not shown) which is connected between the lubricant line 104 and the lubricant port 116. In embodiments in which the control unit 44 comprises two or more lubricant ports 116, the lubricant activation means may comprise a plurality of grease injectors, each of which is connected between the lubricant line and a corresponding lubricant port. Alternatively, the lubricant activation means may comprise a single grease injector and a valve, such as the valve 128, for selectively directing the output of the grease injector to one of the lubricant ports.

In yet another alternative embodiment, the lubricant activation means may comprise a conventional grease valve (not shown) which is connected between the lubricant line 104 and the lubricant port 116. In embodiments in which the control unit 44 comprises two or more lubricant ports 116, the lubricant activation means may comprise a plurality of grease valves, each of which is connected between the lubricant line and a corresponding lubricant port.

In operation, the lubricant activation means is selectively activated to communicate lubricant from the lubricant line 104 through the lubricant port 116 and into the lubricant hose 118. From the lubricant hose 118, the lubricant is communicated through the lubricant fitting and into the interior portion of the valve 14. If the valve comprises two or more lubricant ports 116, the lubricant activation means is activated to select which port the lubricant will be communicated through.

In certain embodiments of the disclosure, the control unit 44 may include means for measuring the volume of lubricant which is injected into each lubricant fitting 44. For example, the control unit 44 may include a sensor 130d (FIG. 5) for detecting the movement of the piston 130c within the lubricant pump 130, and the controller 142 may be configured to count the number of strokes of the piston 130c. Since the volume of the high pressure cylinder 130b of the lubricant pump 130 is known, the controller 142 may be configured to determine the total volume of lubricant discharged from the lubricant pump 130 by multiplying the volume of the high pressure cylinder by the number of strokes of the piston 130c. In another alternative, in the event the lubricant activation means does not include the lubricant pump 130, the controller 142 may be configured to count the number of strokes of the lubricant pump 56 in the lubrication system 48 and sum up the total volume of lubricant which passes through the lubricant line 64.

Referring still to FIG. 5, the hydraulic activation means may comprise, for example, a valve 134 which is connected between the hydraulic pressure and return lines 106, 108 on the one hand and the hydraulic ports 120, 122 on the other hand. The valve 134 may be a manually operated valve or, as shown in FIG. 5, an electrically operated valve, such as a solenoid operated directional control valve. Alternatively, the valve can be pneumatically or hydraulically operated.

In the exemplary embodiment of the disclosure shown in FIG. 5, the valve 134 comprises a four-way, three position valve. In a first position of the valve 134, the hydraulic pressure line 106 is connected to the first hydraulic port 120 and the hydraulic return line 108 is connected to the second hydraulic port 122. In a second position of the valve 134, the hydraulic pressure line 106 is connected to the second hydraulic port 122 and the hydraulic return line 108 is connected to the first hydraulic port 120. In this manner, the hydraulic pressure and return lines 106, 108 can be selectively connected to the piston chambers 38a, 38b to either open or close the valve 14. In an alternative embodiment, the valve 134 may comprise an assembly of individual valves which together operate to selectively connect the hydraulic pressure and return lines 106, 108 to the first and second hydraulic ports 120, 122 in the manner just described.

In accordance with a further embodiment of the disclosure, each control unit 44 may also configured to connect one or one additional control units 44 and/or one or more manifold units 74 to the lubrication system 48 and the HPU 50. As shown in FIG. 5, each control unit 44 comprises a lubricant outlet 136 which is connected to the lubricant line 104, a hydraulic pressure outlet 138 which is connected to the hydraulic pressure line 106 and a hydraulic return outlet 140 which is connected to the hydraulic return line 108. Referring also to FIGS. 3 and 4, the lubricant outlet 136 is connectable to the lubricant hose of a corresponding hose set (e.g., the hose set 78 connecting the first control unit 44a with the second control unit 44b), and the hydraulic pressure and return outlets 138, 140 are respectively connectable to the hydraulic pressure and return hoses of the hose set.

Thus, the lubricant, hydraulic pressure and hydraulic return lines 104, 106, 108 provide conduits through the control unit 44 by which the lubricant, hydraulic pressure and hydraulic return hoses of one hose set can be connected to the lubricant, hydraulic pressure and hydraulic return hoses of a second hose set. In this manner, additional control units and/or manifold units 74 can be connected in series with a first control unit, and from the first control unit the additional control units and/or manifold units can be connected to the lubrication system 48 and the HPU 50.

In addition, the control unit 44 may be provided with one or more additional sets of lubricant, hydraulic pressure and hydraulic return outlets 136, 138, 140 (not shown) which are respectively connected to the lubricant, hydraulic pressure and hydraulic return lines 104, 106, 108. These lubricant, hydraulic pressure and hydraulic return outlets 136, 138, 140 allow for additional corresponding hose sets to be connected to the lubricant, hydraulic pressure and hydraulic return lines 104, 106, 108 of the control unit 44. As a result, further control units 44 and/or manifold units 74 can be connected in parallel with a first control unit, and from the first control unit these control units and/or manifold units cab be connected to the lubrication system 48 and the HPU. It should be noted that in certain embodiments, although the control units 44 may be connected in series, the direction control valves 134 for all the control units 44 may be connected in parallel.

In accordance with the present disclosure, each control unit 44 includes means for controlling its various functions and for communicating with the frac control center 52. As shown in FIG. 5, for example, each control unit 44 may comprise a controller 142 which forms part of an electronics module 144 that is housed within the control unit. The controller 142 may be configured to operate the lubricant activation means to initiate the supply of lubricant to the valve 14. The controller 142 may also be configured to operate the hydraulic activation means to open and close the valve 14.

In certain embodiments, some or all of the functions of the controller 142 may be controlled by a control computer 146 which is located in the frac control center 52. As shown in FIG. 4, the control computer 146 may be operated by an operator through a conventional I/O computer 148. The control computer 146 may alternatively or in addition be operated by an operator using, e.g., a portable tablet-type computing device 150 which communicates with the control computer via a wireless router 152 or any other suitable wireless communications means.

In an exemplary embodiment of the disclosure, the controller 142 may also be configured to communicate wirelessly with the control computer 146. For example, each control unit 44 may include an antenna 154 and an associated communications circuit which is connected to the controller 142 and is designed to communicate wirelessly with, e.g., the wireless router 152 or any other suitable wireless communications means. This arrangement eliminates the need to run communications cables from the control computer 146 to each control unit 44. In other embodiments, one or more communications cables can be run to each control unit 44 individually or bundled with the hydraulic/lubrication lines.

In accordance with another aspect of the disclosure, the electronic devices within each control unit 44, including the electronics module 144 and preferably also the solenoid drivers for the valves 128, 132, 134 (in the event these devices are electrically actuated), are Class 1, Division 1-compliant. Further, the electronic devices may be powered by a suitable battery 156 located within the control unit 44. As a result, the need to run power cables to each control unit 44 is eliminated. In other embodiments, the control unit 44 could be powered by a power cable, which may be bundled with the hydraulic and lubricant lines.

Figure 6:
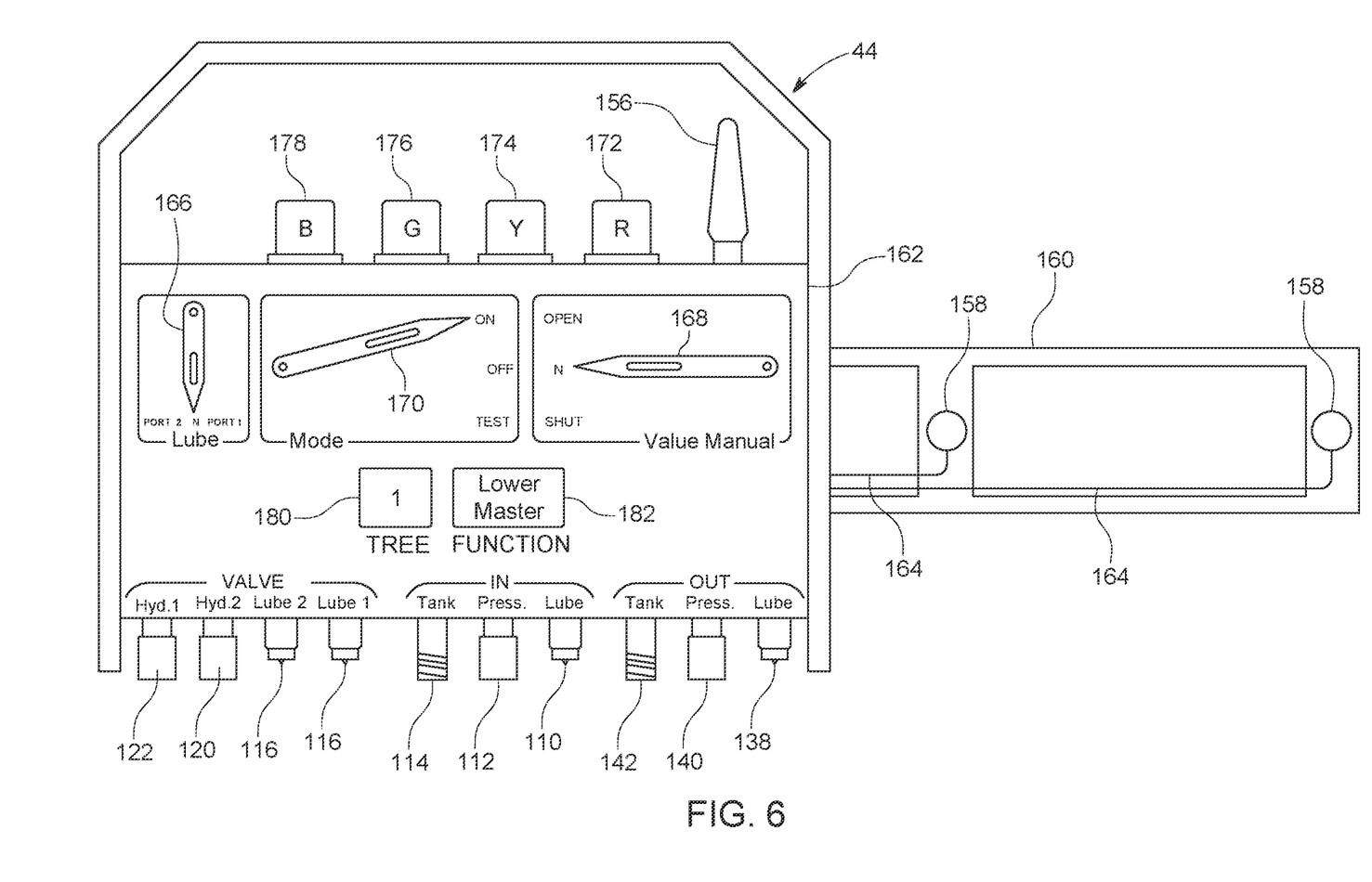
FIG. 6 is a side elevation representation of the control unit of FIG. 5.

Each control unit 44 may include means for monitoring certain conditions of its corresponding valve 14. For example, each control unit 44 may comprise one or more position sensors 158, such as conventional Hall-effect sensors, for detecting the position of, e.g., the shaft 34 of the actuator 28 in order to provide an indication of whether the valve 14 is open or closed. Referring also to FIGS. 3 and 6, the position sensors 158 may be mounted on a bracket 160 which is attached to a housing 162 for the control unit 44 and connected to the electronics module 144 using corresponding leads 164. In the embodiment of the disclosure shown in the drawings, the control unit 44 comprises two position sensors 158: a first position sensor which is positioned on the bracket 160 so as to detect the shaft 34 when the valve is in the closed position, and a second position sensor which is positioned on the bracket so as to detect the shaft when the valve is in the open position. In other embodiments a linear displacement sensor, such as a linear potentiometer, may be used to allow the exact position of the actuator shaft 34 to be detected.

In an exemplary embodiment of the disclosure, each control 44 unit may include means for enabling an operator to manually operate certain features of the control unit. As shown in FIGS. 5 and 6, for example, each control unit 44 may include a lubrication switch 166 to enable an operator to manually activate the lubricant activation means. In the case where the control unit 44 comprises two lubricant ports 116, the lubrication switch 166 may be configured to allow the operator to select which port to connect the lubricant line 104 to. The lubrication switch 166 may also comprise a neutral, or "N", position to which the switch is set to enable automatic operation of the lubricant activation means. Moreover, the switch 166 may be spring biased into this position.

Each control unit 44 may also include a "valve manual" switch 168 to enable manual operation of the valve 14. When switched to the "open" position, the controller 142 will activate the hydraulic activation means to thereby open the valve 14. When switched to the "closed" position, the controller 142 will activate the hydraulic activation means to close the valve 14. The valve manual switch 168 may also include a neutral, or "N", position to which the switch is set to enable automatic operation of the hydraulic activation means. As with the lubrication switch 166, the switch 168 may be spring biased into the neutral position.

Each control unit 44 may further comprise a mode switch 170 to enable the operator to control certain states of the control unit. For example, in the "on" position communication between the control unit 44 and the control computer 146 in the frac control center 52 is enabled. In the "off" position the control unit 44 is placed in a low power state. In this state, communication between the control unit 44 and the control computer 146, and preferably also the lubricant activation means and the hydraulic activation means, are disabled. Finally, in the "test" position the controller 142 enables manual operation of the lubrication and valve switches 166, 168, and, as will be made clear below, reads the location and function tags on the valve 14 and tests the indicator lamps on the control unit 44.

In the event the housing 162 for the control units 44 is required to be Class 1, Division 1-compliant, each switch 166, 168, 170 must also be Class, Division 1 compliant. Also, the handles of switches 166, 168 and 170 may be configured such that in addition to being able to be activated by hand, they can be active at some height above the ground by means of a pole or special tool, such that the operator is not required to be close to the control unit 44.

In accordance with a further embodiment of the invention, each control unit 44 may include a number of visual indicators, such as status lamps, which are operated by the controller 142 to provide visual indications of certain conditions of the system. In the embodiment of the disclosure shown in FIG. 5, for example, each control unit 44 includes four different color lamps: a red lamp 172, a yellow lamp 174, a green lamp 176 and a blue lamp 178. The red lamp 172 may be used to indicate that the control unit 44 is not communicating with the control computer 146. For example, the controller 142 may be configured to cause the red lamp 172 to blink quickly when a fault condition such as a hardware or software problem exists, and to blink slowly when the control unit 44 is in the test mode.

The yellow lamp 174 may be used to indicate that the valve 14 is moving. For example, the controller 142 may be configured to cause the yellow lamp 174 to blink quickly for two seconds prior to movement of the valve 14 and then to remain steadily illuminated during movement of the valve. The yellow lamp 174 may also be used during setup of the system to identify the particular control unit 44 to which the control computer 146 is linked.

The green lamp 176 may be used to indicate that the control unit 44 is online, is linked to the control computer 146 and is ready for operation. For example, the controller 142 may be configured to cause the green lamp 176 to blink quickly when the control unit 44 is communicating with the control computer 146 and to remain steadily illuminated when all the voltages and checks on the control unit are good. As with the yellow lamp 174, the green lamp 176 may also be used during setup of the system to identify the particular control unit 44 to which the control computer 146 is linked.

Finally, the blue lamp 178 may be used to indicate that the lubricant activation means is operating. For example, the controller 142 may be configured to cause the blue lamp 178 to blink quickly for two seconds prior to operation of the lubricant activation means and to remain steadily illuminated during operation of the lubricant activation means.

In order to control the various aspects of the fracking operation, the control computer 146 must know which valves 14 the control units 44 are connected to. In one embodiment, each control unit 44 is assigned a unique identifier, and this identifier, along with the location and function of the valve 14 to which the control unit is or will be connected, is stored in digital form in a storage device which is accessible to the control computer 146. The location of a valve 14 can be, e.g., the particular tree 12 on which the valve is situated. For instance, each tree 12 can be assigned a unique number (e.g., 1, 2, etc.), and this number can be used to identify the location of the valve 14. The function of the valve 14 is the specific purpose which the valve is intended to fulfill on the tree (e.g., upper master valve, lower master valve, swab valve, wing valve, etc.). Thus, the location and function information is sufficient to identify each valve 14 at the frac site. Consequently, the control computer 146 can command any particular valve to be lubricated and/or opened or closed by sending corresponding instructions to the control unit 44 whose identification number is associated with that valve.

In another embodiment, the valve control and lubrication system of the present disclosure may be configured to automatically identify the valves 14 to which the control units 44 are connected. As in the previous embodiment, each control unit 44 is assigned an individual identifier. In addition, each control unit 44 is provided with means for designating the location and function information of the valve 14 to which the control unit is or will be connected, and means for determining the location and function information from the designating means.

The means for designating the location and function information of the valve to which the control unit 44 is connected may comprise a number of tags which are encoded with the location and function information. As shown in FIG. 6, for example, the designating means may comprise two tags, a location tag 180 which is encoded with a distinct number that is used to identify a particular frac tree 12, and a function tag 182 which is encoded with a discrete code to identify a particular valve function. This information may also be printed on the tags 180, 182 to enable an operator to readily discern the location and function of a specific valve 14.

The tags 180, 182 may be machine readable tags which are electrically encoded with the location and function information. For example, the tags 180, 182 may comprise radio frequency identification (RFID) tags or any other suitable machine readable tags. In addition, the tags 180, 182 may be either permanently or removably connected to the control units 44. In one embodiment, for instance, the tags 180, 182 are made of a magnetic material to enable them to be attached to the control units 44 magnetically. The tags 180, 182 can thus be removed and replaced with different location and function tags, if desired.

The ability to replace the tags 180, 182 provides a degree of flexibility to the fracking operation. For example, a particular valve 14 may be assigned a different function by simply removing its existing function tag 182 from the control unit 44 and replacing it with a tag which is encoded with a different function. From that point on, the control computer will associate the control unit 44 with a valve 14 having the function which is encoded in the new tag 182. In this manner, the fracking operation can be quickly and easily reconfigured by assigning different functions to certain valves.

The means for determining the location and function information from the tags 180, 182 may comprise a suitable electronic media reader which is connected to the controller 142. As shown in FIG. 5, for example, if the tags 180, 182 are RFID tags, the means for determining the location and function information from the tags may comprise an RFID reader 184. In addition, the controller 142 may be configured such that, upon power up or being placed in the test mode, for example, the controller will command the RFID reader 184 to read the tags 180, 182 to determine the location and function of the valve to which the control unit 44 is connected. Then, either automatically or in response to a request from the control computer 146, the controller 142 will transmit the location and function information, along with the identification number of the control unit 44, to the control computer. Based on this information, the control computer 142 can build a data map (e.g., a table or database) of each control unit 44 at the frac site, as well as the location and function of its corresponding valve 14.

Figure 7:
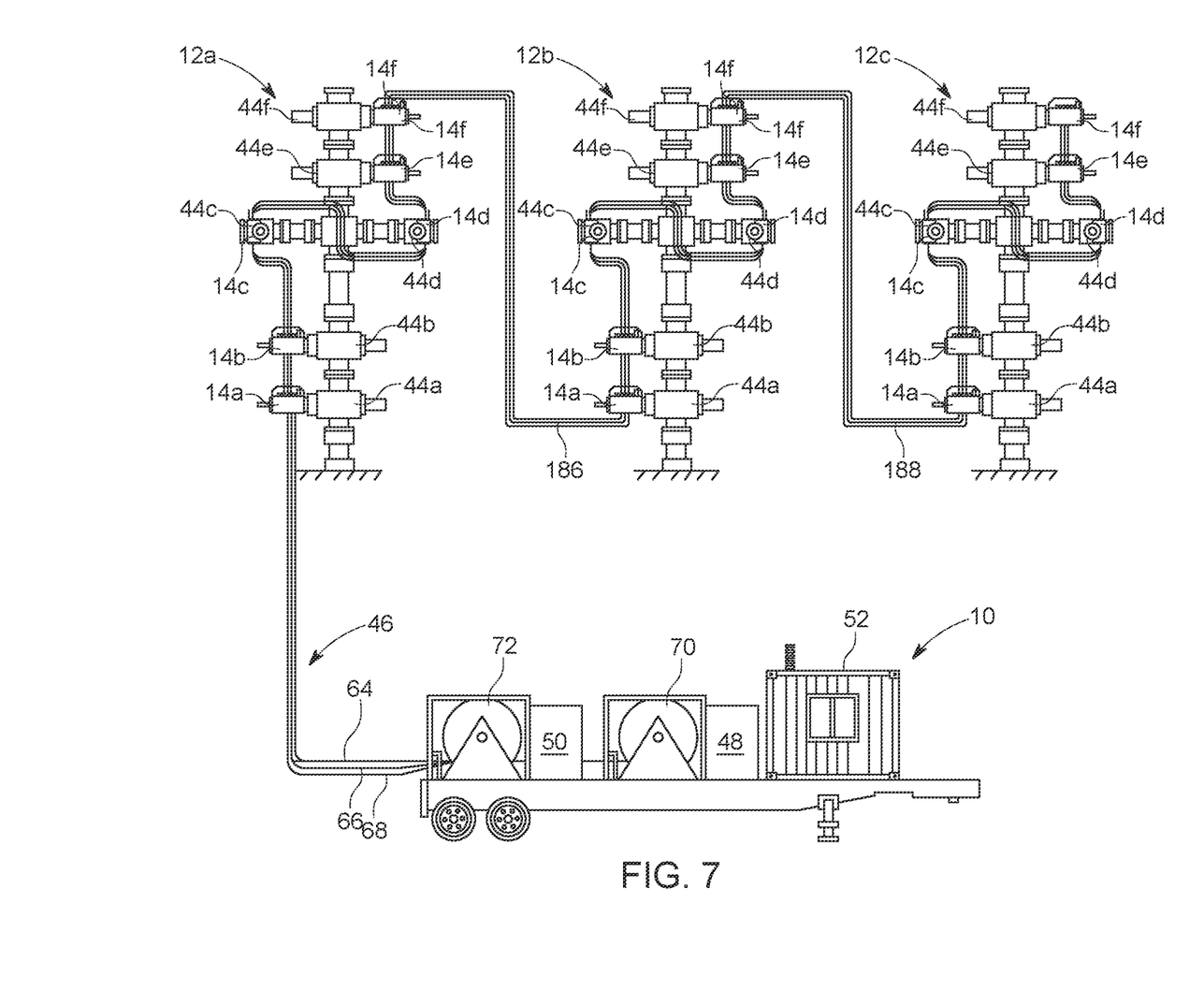
FIG. 7 is a schematic representation showing another embodiment of the valve control and/or lubrication system of the present disclosure in the context of an illustrative well fracturing site comprising a control center and a number of frac trees.

Another embodiment of the valve control and/or lubrication system of the present disclosure is shown in FIG. 7. The embodiment shown in FIG. 7 is similar in many respects to the embodiment of the valve control and/or lubrication system shown in FIG. 1. In the embodiment of FIG. 7, however, the manifold units 74 are omitted. Instead, the first hose set 46 is connected directly to a first control unit 44a on the first tree 12a, and the remaining control units 44b-44f on the first tree are connected in series with the first control unit 44a. In addition, the last control unit 44f on the first tree 12a is connected via a hose set 186 to the first control unit 14a on the second tree 12b, and the last control unit 14f on the second tree 12b is connected via a hose set 188 to the first control unit 14f on the third tree 12c. In this manner, all of the control units 44 on all of the trees 12 are connected in series with the lubrication system 48 and the HPU 50.

In other embodiments the manifold units 74 may be omitted and the lubricant hose 64 and the hydraulic pressure and return hoses 66, 68 may instead be connected to respective "T" fittings positioned on or adjacent the first tree 12a or in a first control unit 44a on the first tree. From these "T" fittings, the first control unit 44a can be connected in series with the remaining control units on the first tree 12a as well as to the lubricant hose and hydraulic pressure and return hoses leading to the second tree 12b, and so on.

It should be understood that the valve control and/or lubrication system of the present disclosure can be adapted for use with other types of valves and valve actuators than those depicted in FIG. 2. For example, in another type of prior art valve actuator, not shown in the drawings, the cylinder comprises a single piston chamber which is connectable to the hydraulic pressure source, and the actuator includes a spring which is connected to the shaft. By selectively connecting the piston chamber to the hydraulic pressure source, the piston will move the gate in one direction (e.g., from the closed position to the open position), and by disconnecting the piston chamber from the hydraulic pressure source, the spring will move the gate in the opposite direction (e.g., from the open position to the closed position).

It should also be understood that the system of the present disclosure can be adapted for use with electrical valve actuators. In such an application, the system would not require hydraulic pressure and return hoses and the control units would not require hydraulic pressure and return lines. Instead, each control unit would be configured to communicate electrical power to its associated valve actuator. The electrical power may be provided by a central power unit and communicated to, e.g., a first control unit over a suitable power cable. From the first control unit, the electrical power may then be distributed to the remaining control units at the frac site.

In these types of valves, neither the control units 44 nor the manifold units 74, if present, require a hydraulic return line. In addition, the control units 74 require only one hydraulic port 122, 124 and one hydraulic conduit or hose 124, 126 to connect the hydraulic pressure line 106 to the hydraulic actuator on the valve. Furthermore, the hydraulic activation means need only operate to selectively connect or disconnect the hydraulic pressure line 106 to the single hydraulic port 122, 124 in order to operate the valve. Finally, the hose sets connecting the control units 44 and manifold units 74 to each other and to the lubrication system 48 and the HPU 50 do not require a hydraulic return hose.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A system for operating and/or lubricating a plurality of valves which are mounted on a number of Christmas trees, each valve comprising a hydraulic actuator which is operated by hydraulic pressure from a hydraulic pressure source and/or a lubricant inlet which is connected to an interior portion of the valve that is configured to receive a lubricant from a lubricant source, the system comprising:

a plurality of control units, each of which is associated with a respective valve, each control unit comprising a hydraulic pressure line which is connectable to the hydraulic pressure source and a lubricant line which is connectable to the lubricant source;

each control unit further comprising a hydraulic port and a lubricant port;

a hydraulic conduit which is connected between the hydraulic port and the hydraulic actuator and a lubricant conduit which is connected between the lubricant port and the lubricant inlet;

each control unit further comprising a hydraulic activation means for selectively connecting the hydraulic pressure line to the hydraulic port and a lubricant activation means for selectively connecting the lubricant line to the lubricant port;

whereby each control unit is operable to selectively connect the hydraulic pressure source to the hydraulic actuator to thereby operate the valve and to selectively connect the lubricant source to the lubricant inlet to thereby communicate lubricant into the interior portion of the valve.

2. The system of claim 1, wherein the hydraulic activation means comprises an electrically, hydraulically or pneumatically operated first valve which is connected between the hydraulic pressure line and the hydraulic port.

3. The system of claim 2, wherein the first valve comprises a solenoid operated valve.

4. The system of claim 1, wherein each control unit further comprises a hydraulic return line which is connectable to the hydraulic pressure source and first and second hydraulic ports which are connected via respective first and second hydraulic conduits to the hydraulic actuator, and wherein the hydraulic activation means is operable to selectively connect the hydraulic pressure and return lines to the hydraulic actuator to thereby operate the valve.

5. The system of claim 4, wherein the hydraulic activation means comprises an electrically, hydraulically or pneumatically operated first valve which is connected between the hydraulic pressure and return lines and the first and second hydraulic ports.

6. The system of claim 5, wherein the first valve comprises a solenoid operated directional control valve.

7. The system of claim 1, wherein the lubricant activation means comprises a first valve which is connected between the lubricant line and the lubricant port.

8. The system of claim 1, wherein the lubricant activation means comprises a lubricant pump which is connected between the lubricant line and the lubricant port.

9. The system of claim 8, wherein the lubricant pump comprises a first cylinder which is alternately connectable to the hydraulic pressure and return lines and a second cylinder which is connected to the lubricant line.

10. The system of claim 9, wherein the lubricant activation means further comprises an electrically, hydraulically or pneumatically operated first valve which is connected between the first cylinder and the hydraulic pressure and return lines, and wherein the first valve is configured to alternately connect the first cylinder to the hydraulic pressure and return lines to thereby operate the lubricant pump.

11. The system of claim 10, wherein the valve comprises first and second lubricant inlets, each control unit comprises first and second lubricant ports which are connected to the lubricant inlets by respective first and second lubricant conduits, and the lubricant activation means further comprises an electrically, hydraulically or pneumatically operated second valve which is connected between the lubricant pump and the first and second lubricant ports.

12. The system of claim 11, wherein at least one of the first and second valves comprises a solenoid operated directional control valve.

13. The system of claim 1, wherein each control unit comprises a controller which is configured to operate the hydraulic activation means and/or the lubricant activation means.

14. The system of claim 13, wherein each control unit further comprises means for enabling an operator to manually operate the hydraulic activation means and/or the lubricant activation means.

15. The system of claim 13, further comprising a control computer which is located remotely of the Christmas trees and is configured to control the operation of the controllers.

16. The system of claim 15, further comprising means for identifying to the control computer the valves to which the control units are connected.

17. The system of claim 16, wherein the identifying means comprises a unique identifier for each control unit and location and function information for the valve to which each control unit is or will be connected, the identifier and location and function information being stored in digital form in a storage device which is accessible by the control computer.

18. The system of claim 17, wherein the identifying means further comprises means for designating the location and function information of each valve and means for determining the location and function information from the designating means.

19. The system of claim 18, wherein the designating means comprises a number of machine-readable tags which are connected to each control unit and are encoded with the location and function information of the valve to which the control unit is will be connected.

20. The system of claim 19, wherein the determining means comprises an electronic media reader which is configured to read the tags.

21. The system of claim 19, wherein the tags are removably connected to the control units.

22. The system of claim 13, wherein each control unit further comprises a number of status lamps, and wherein the controller is configured to operate the status lamps to provide visual indications of certain conditions of the control unit.

23. The system of claim 1, wherein the hydraulic pressure and return lines of each control unit on each Christmas tree are connected in series with the hydraulic pressure and return lines of another control unit on that tree.

24. The system of claim 1, further comprising a number of manifold units, each of which is positioned on or adjacent a corresponding Christmas tree, wherein the control units of each tree are connected either directly or indirectly to the manifold unit for that tree.

25. The system of claim 24, wherein each manifold unit is connected in series with another manifold unit.

26. The system of claim 1, wherein each control unit is positioned on its respective valve.

* * * * *

UNITED STATES PATENT AND TRADEMARK OFFICE
CERTIFICATE OF CORRECTION

PATENT NO. : 10,982,808 B2
APPLICATION NO. : 16/407085
DATED : April 20, 2021
INVENTOR(S) : James Michael Zerkus et al.

It is certified that error appears in the above-identified patent and that said Letters Patent is hereby corrected as shown below:

On the Title Page

(73) Assignee should read:
FMC Technologies, Inc., Houston, TX (US)

In the Claims

Column 16, Line 52 In Claim 1 should read:
1. A system for operating and lubricating a plurality
of valves which are mounted on a number of christmas trees,
each valve comprising a hydraulic actuator which is oper-
ated by hydraulic pressure from a hydraulic pressure source
and a lubricant inlet which is connected to an interior
portion of the valve that is configured to receive a lubricant
from a lubricant source, the system comprising:
    a plurality of control units, each of which is associated
        with a respective valve, each control unit comprising a
        hydraulic pressure line which is connectable to the
        hydraulic pressure source and a lubricant line which is
        connectable to the lubricant source;
    each control unit further comprising a hydraulic port and
        a lubricant port;
    a hydraulic conduit which is connected between the
        hydraulic port and the hydraulic actuator and a lubri-
        cant conduit which is connected between the lubricant
        port and the lubricant inlet;
    each control unit further comprising a hydraulic activation
        means for selectively connecting the hydraulic pressure
        line to the hydraulic port and a lubricant activation
        means for selectively connecting the lubricant line to Signed and Sealed this
Seventeenth Day of August, 2021

Drew Hirshfeld
*Performing the Functions and Duties of the
Under Secretary of Commerce for Intellectual Property and
Director of the United States Patent and Trademark Office*